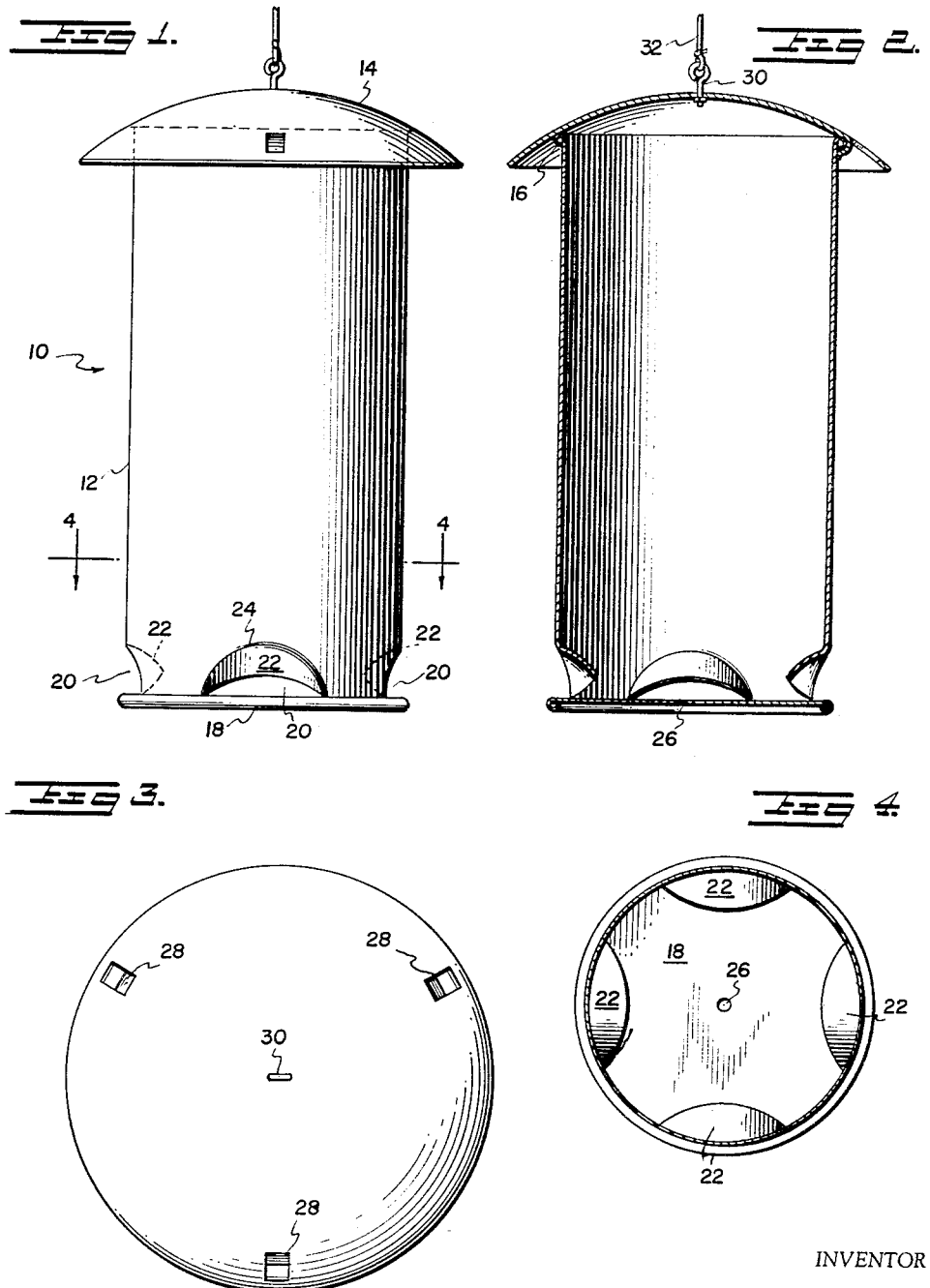

United States Patent Office 2,705,938
Patented Apr. 12, 1955

2,705,938

FEEDER FOR BIRDS

William Greenough, Rhinebeck, N. Y.

Application November 16, 1953, Serial No. 392,284

7 Claims. (Cl. 119—52)

This invention relates to feeding devices for birds and more particularly to a feeding device which is selective in that it dispenses food only to tree-climbing birds and not to scavenger-type birds.

A problem which arises in connection with the feeding of birds using feeders of the types commonly in use is that certain types of scavenger birds, such as English sparrows, starlings and grackles, gather in large numbers at the feeder and take most of the feed, driving away more desirable native birds or the so-called "wild-tree" or tree-climbing birds.

A common characteristic of most scavenger birds is that they are awkward and unaccustomed to perching in precarious positions while feeding in their natural habitat. On the other hand, most of the so-called wild-tree birds are agile and able to feed while in a precarious position.

Accordingly, it is an object of this invention to provide a feeding device for wild birds which is so constructed as to permit feeding only by the so-called wild-tree or tree-climbing birds and which excludes feeding by the more awkward scavenger birds, such as Engling sparrows, starlings and grackles.

It is another object of this invention to provide a selective feeding device for feeding wild birds which is simple in construction and inexpensive to manufacture.

It is still another object of this invention to provide a feeding device for wild birds which is so constructed as to dispense feed onto a portion of the feeder where it can be reached by wild-tree birds, but which substantially prevents loss of feed from the dispenser onto the ground, thereby minimizing waste of the seed or other bird food.

In achievement of these objectives, this invention provides a bird-feeding device in the form of a hollow container adapted to be hung from a supporting member such as the branch of a tree. The container may be cylindrical, square, rectangular, or of any other suitable shape. The container is provided adjacent its bottom edge with a plurality of peripherally spaced openings, the upper edge of each opening being bounded by an inwardly extending bent surface portion which prevents the seed or other bird food from falling out of the feeder and dropping to the ground. The bottom end of the feeder provides only a very limited supporting area to be gripped by the bird when feeding, thereby offering a foothold which is too precarious for birds of the scavenger type but which is an adequate support for the so-called wild-tree birds.

Other objects of the present invention will become more apparent from the following detailed description taken in conjunction with the attached drawing in which:

Fig. 1 is a front elevation of a bird-feeding device in accordance with the invention:

Fig. 2 is a vertical section through the feeding device of Fig. 1;

Fig. 3 is a top plan view of the bird-feeding device; and

Fig. 4 is a view in section along line 4—4 of Fig. 1.

Referring now to the drawing, in the illustrated embodiment of the invention, the bird feeder, generally indicated at 10 comprises a hollow container having cylindrical body portion 12 which is preferably, although not necessarily, of metal construction, and a cover member 14. The cylindrical body member 12 is open at its upper end, where it is provided with a rolled edge 16. At its lower end, the body 12 is provided with an end closure 18 integral with or rigidly attached to the body 12 and having substantially the same outer diameter as the outer periphery of body 12, or of only slightly greater diameter than body 12.

A plurality of circumferentially spaced apertures 20 are provided adjacent the lower end of the cylindrical body 12. The upper boundary of each aperture is defined by the bottom edge of an inwardly extending arcuate concave surface portion 22 provided above each aperture. Where the cylinder 12 is made of metal, the surfaces 22 may be formed by pushing the outer cylindrical surface inwardly, the pushed-in portion being defined at its lower boundary by the bottom edge of the cylinder and at its upper boundary by the arcuate line 24. Each of the inwardly bent surfaces 22 provides a recess extending inwardly from the outer surface of the cylinder, and the portion of bottom 18 lying within each recess provides a limited foothold for the feeding bird. At the same time, the aperture 20 provides access to the feed by the bird.

The container 12 may be made of a large size tin can having an open top and an integral bottom end 18. In such case, the concave surfaces 22 are formed by horizontally cutting or slitting the bottom edge of the container at the junction of the cylindrical portion 12 with the end closure 18 and pushing the metal surface above each slit inwardly to form a concave radius bend. The bottom edge of the bent surface 22 is automatically raised above the surface of bottom closure 18 by the bending operation to thereby define the aperture 20.

In order to provide drainage of any water that collects in the lower end of the cylindrical body 12, the bottom end 18 is provided with a central drainage hole or aperture 26.

To permit filling the container with bird food, and also to permit cleaning the interior of the container, a detachable cover 14 is provided. The detachable cover 14 illustrated is of convex or dome shape but obviously the cover could be of other shapes, such as cone-shaped, or flat. The cover is provided with downwardly bent ears 28 which may be formed by cutting or punching the surface of the cover 14 and bending the cut material downwardly to form the ears. When the cover is positioned above the body 12, the ears 28 engage the rolled edge 16 at the upper end of the body to retain the cover in position. A hook or eyelet 30 is attached to a central portion of the cover 14 and a means of suspension, such as a cord or wire 32, is connected to the eyelet 30.

In use, the container 12 is filled with seed or other bird food when the cover 14 is removed. The cover is then snapped back into position, the ears 28 engaging the rolled edge 16, and the feeder is suspended from a suitable suspension means such as a tree limb. The inwardly bent concave surfaces 22 prevent seed or other feed from falling out of the container 12 and spilling onto the ground. The surface of bottom closure 18 of the feeder provides a limited foothold for the feeding bird in the region of the apertures 20 but the footholds are of such limited and precarious extent as to deter or prevent scavenger-type birds from using the feeder while at the same time permitting use of the feeder by the wild-tree birds that are capable of feeding in such a position.

It can be seen from the foregoing that there is provided in accordance with this invention a bird feeder which selectively dispenses feed to the wild-tree type of bird but excludes feeding by the scavenger-type of bird, such as the English sparrow, starling, or grackle. Furthermore, the feeding device of the invention is simple in construction and is inexpensive to manufacture.

While there has been described and illustrated an embodiment of the invention, it is to be understood that I do not intend to be restricted solely thereto but that I intend to cover all modifications thereof which would be apparent to one skilled in the art and which come within the spirit and scope of the invention.

What I claim as my invention is:

1. A bird feeding device for disposition in substantially spaced relation to the ground surface comprising a hollow body member, a bottom closure for said body memmer, said body member having an aperture extending upwardly from said bottom closure and an inwardly bent surface extending above said aperture and defining the upper boundary of said aperture.

2. A bird feeding device for disposition in substantially spaced relation to the ground surface comprising a hollow body member, a bottom closure for said body member, said closure having substantially the same peripheral dimensions as said body member, said body member having an aperture extending upwardly from said bottom closure, and an inwardly bent surface extending above said aperture and defining the upper boundary of said aperture.

3. A bird feeding device for disposition in substantially spaced relation to the ground surface comprising a hollow body member, a bottom closure for said body member, said body member having a plurality of circumferentially spaced apertures extending upwardly from said bottom closure, the surface of said body member having an inwardly bent concave portion extending above each of said apertures, the bottom edge of the respective concave portions defining the upper boundary of the respective apertures.

4. A bird feeding device for disposition in substantially spaced relation to the ground surface comprising a hollow body member, a bottom closure for said body member, said closure having substantially the same peripheral dimensions as said body member, a detachable cover member for said body member, said body member having at least one aperture extending upwardly from said bottom closure and an inwardly bent surface forming the upper boundary of said aperture.

5. A bird feeding device for disposition in substantially spaced relation to the ground surface comprising a hollow body member, a bottom closure for said body member, said closure having substantially the same peripheral dimensions as said body member, a detachable cover member for said body member, said body member having a plurality of circumferentially spaced apertures extending upwardly from said bottom closure, the surface of said body member having an inwardly bent concave portion extending above each of said apertures, the bottom edge of the respective concave portions defining the upper boundary of said respective apertures.

6. A bird feeding device for disposition in substantially spaced relation to the ground surface comprising a cylindrical body, a bottom closure for said body of substantially the same diameter as said body, a detachable cover member for said body having at least one aperture extending upwardly from said bottom closure, said body having an inwardly bent surface above each aperture forming the upper boundary of the respective aperture, said inwardly bent surface serving to prevent bird feed from falling through said aperture.

7. A bird feeding device for disposition in substantially spaced relation to the ground surface comprising a cylindrical body, a bottom closure for said body of substantially the same diameter as said body, a detachable cover member for said body, means carried by said cover for suspending said feeding device above the ground, said body having at least one aperture extending upwardly from said bottom closure and an inwardly bent surface above each aperture forming the upper boundary of the respective aperture, said inwardly bent surface serving to prevent bird feed from falling through said aperture.

References Cited in the file of this patent

UNITED STATES PATENTS

| | | |
|---|---|---|
| 1,440,875 | Howard | Jan. 2, 1923 |
| 1,542,891 | Klaassen | June 23, 1925 |
| 1,607,155 | Felker | Nov. 16, 1926 |
| 1,843,459 | Niehage | Feb. 2, 1932 |
| 1,891,042 | Benoit | Dec. 13, 1932 |
| 2,666,415 | Scruggs | Jan. 19, 1954 |

FOREIGN PATENTS

| | | |
|---|---|---|
| 54,436 | Switzerland | Sept. 16, 1911 |